United States Patent [19]

Tsubakimoto et al.

[11] Patent Number: 4,870,120
[45] Date of Patent: Sep. 26, 1989

[54] CEMENT DISPERSANT

[75] Inventors: Tsuneo Tsubakimoto, Toyonaka; Hideyuki Tahara, Osaka; Hiroya Kobayashi, Minoh; Tsuyoshi Hirata, Takatsuki; Hiroshi Ito, Osaka, all of Japan

[73] Assignee: Nippon Shokubai Kagaku Co., Ltd., Osaka, Japan

[21] Appl. No.: 155,220

[22] Filed: Feb. 12, 1988

Related U.S. Application Data

[63] Continuation-in-part of Ser. No. 51,918, May 19, 1987, abandoned.

[51] Int. Cl.$^4$ .............................. C08K 3/18; C08K 3/00
[52] U.S. Cl. ........................................ 524/5; 524/2; 526/287
[58] Field of Search ........................ 524/2, 5

[56] References Cited

U.S. PATENT DOCUMENTS

| | | | |
|---|---|---|---|
| 3,024,221 | 3/1962 | Le Fevre | 526/287 |
| 3,033,833 | 5/1962 | Le Fevre | 526/287 |
| 3,250,736 | 5/1966 | Gibbs | 524/3 |
| 3,312,671 | 4/1967 | Swisher | 526/287 |
| 4,086,200 | 4/1978 | Lamoria | 524/5 |
| 4,450,013 | 5/1984 | Hirsch et al. | |
| 4,558,092 | 12/1985 | Reinecke et al. | |

FOREIGN PATENT DOCUMENTS 0190353  8/1986  European Pat. Off. .

OTHER PUBLICATIONS

Chem. Abs., 107, (12) p. 324, col. 1, No. 101707.

*Primary Examiner*—Christopher Henderson
*Attorney, Agent, or Firm*—Omri M. Behr

[57] ABSTRACT

A cement dispersant having as a main component thereof at least one polymer selected from the group consisting of polymers obtained from (A) 0.1 to 100 mol % of a sulfonic acid type monomer represented by the formula I:

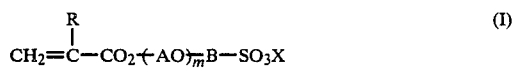

(I)

wherein R stands for hydrogen atom or methyl group, X stands for hydrogen atom, a monovalent metallic atom, a divalent metallic atom, ammonium group, or an organic amine group, A and B independently stand for an alkylene group of 2 to 4 carbon atoms, m stands for 0 or an integer of the value of 1 to 100, and the alkylene oxide group of 2 to 4 carbon atoms in the portion, $(AO)_m$ may be bound in any desired sequence, and (B) 99.9 to 0 mol % of other monomer copolymerizable with said sulfonic acid type monomer, and polymers obtained by neutralizing said polymers with an alkaline substance, a cement composition containing the dispersant and a method for dispersing a cement.

9 Claims, No Drawings

CEMENT DISPERSANT

That is a continuation-in-part of copending application Ser. No. 051,918, filed May 19, 1987, which is abandoned.

BACKGROUND OF THE INVENTION

1. Field of the Invention

This invention relates to a cement dispersant. More specifically, it relates to a cement dispersant to be used in mortar works and concrete works for the purpose of improving the efficiency of operations to be performed, enhancing the strength and durability of products to be obtained, repressing the tendency of products toward cracking, and improving other physical properties of products.

2. Description of the Prior Art

Preferably, lignin sulfonates salts, such as of gluconic acid and glucoheptoic acid, naphthalene sulfonic acid-formaldehyde condensation salt, and polysaccharide have been used as cement dispersants. The lignin sulfonates are obtained from the process for production of sulfite pulp. They have the disadvantage that their water-reducing effects are dispersed and their increased incorporation of air brings about adverse effects on the physical products of mortar and concrete structures to be produced. The salts of gluconic acid and glucoheptoic acid are such that when they are added in a large amount for the purpose of ensuring high flowability, they result in considerable retardation and impairment of hardening, possibly to the extent of rendering them useless. Starch hydrolyzate is a polysaccharide type cement dispersant. When this cement dispersant is used by itself, it conspicuously shows its tendency to retard the hardening. It is, therefore, used generally in combination with calcium chloride or triethanolamine. Unfortunately, calcium chloride is harmful to the prevention of reinforcing steel bars from rusting.

Cement dispersants of the naphthalene sulfonic acid-formaldehyde condensation salt type excel in the efficiency of water-reduction and allow high flowability without entailing any considerable retardation of hardening and, therefore, they have found extensive utility as a high-range water-reducing agents for the manufacture of concrete products and as a super plasticizer for ready-mixed concrete.

Cement dispersants of the naphthalene sulfonic acid-formaldehyde condensates salt type, however, suffer from the disadvantage that the water-reducing effects are observed for only a short period and the so-called slump loss is so conspicuous that the flowability (slump) of concrete notably decreases after of 20 to 30 minutes following addition of the dispersant. In a plant for the manufacture of concrete products in which a cement composition such as mortar or concrete is conveyed under the pressure by a pump, for example, when the conveyance by the pump is sometimes suspended temporarily for a lunchtime or because of a mechanical problem. Subsequently it is restarted and the pressure for the conveyance may be sharply increased possibility to the extent of clogging the pump or inducing other similar mechanical trouble. When the cement composition is placed in a mold and the subsequent forming of the cement composition e.g. by compaction, is delayed for some reason or other, incomplete filling may result.

Furthermore, where a cement dispersant is used in the ready-mixed concrete, the incorporation of the cement dispersant cannot be carried out in the manufacturing plant for the ready-mixed concrete and must therefore be made in the immediate neighborhood of the site where the concrete to be used. Unfortunately, the high-speed agitation of the added cement dispersant in the concrete within the mixer car may well result in unacceptable noise. This cement dispersion may also cause the pump being used for the purpose of conveying the concrete to suffer from mechanical trouble or may result in incomplete filling of the mold.

An object of this invention, therefore, is to provide a novel cement dispersant.

Another object of this invention is to provide a cement dispersant which allows high flowability without entailing any appreciable retardation of hardening, which permits the high flowability over a long time, which ensures stable workability, and which excels in the ability to curb the phenomenon of slump loss.

Still another object of this invention is to provide a novel cement composition.

Yet another object of this invention is to provide a novel method for dispersing the cement.

SUMMARY OF THE INVENTION

The objects described above are accomplished by a cement dispersant having as a main component thereof at least one polymer selected from the group consisting of water soluble polymers obtained from (A) 1 to 99 mol % of a sulfonic acid type monomer represented by the formula I:

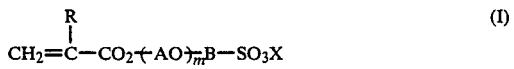
(I)

wherein R stands for hydrogen atom or methyl group, X stands for hydrogen atom, a monovalent metallic atom, a divalent metallic atom, ammonium group, or an organic amine group, A and B independently stand for an alkylene group of 2 to 4 carbon atoms, m stands for 0 or an integer of the value of 1 to 100, and the alkylene oxide group of 2 to 4 carbon atoms in the portion, $(AO)_m$, may be bound in any desired sequence, and (B) 99 to 1 mol % of other monomer copolymerizable with the sulfonic acid type monomer, and polymers obtained by neutralizing the aforementioned polymers with an alkaline substance.

The objects are also accomplished by a cement composition comprising a cement, a dispersant having as a main component thereof at least one polymer selected from the group consisting of water soluble polymers obtained from (A) 0.1 to 100 mol % of a sulfonic acid type monomer represented by the formula I:

(I)

wherein R stands for hydrogen atom or methyl group, for hydrogen atom, a monovalent metallic atom, a divalent metallic atom, ammonium group, or an organic amine group, A and B independently stand for an alkylene group of 2 to 4 carbon atoms, m stands for 0 or an integer of the value of 1 to 100, and the alkylene oxide group of 2 to 4 carbon atoms in the portion, $(AO)_m$, may be bound in any desired sequence, and (B) 99.9 to 0 mol % of other monomer copolymerizable with the sulfonic acid type monomer, and polymers obtained by neutralizing the aforementioned polymers with an alkaline substance, and water, wherein an amount of said dispersant is 0.01 to 5 parts by weight per 100 parts by weight of said cement, and an amount of water is 10 to 100 parts by weight per 100 parts by weight of said cement and said dispersant.

The objects are also accomplished by a method for dispersing a cement which also comprises adding a cement dispersant having as a main component thereof at least one polymer selected from the group consisting of water soluble polymers obtained from (A) 0.1 to 100 mol % of a sulfonic acid type monomer represented by the formula I:

(I)

wherein R stands for hydrogen atom or methyl group, X stands for hydrogen atom, a monovalent metallic atom, a divalent metallic atom, ammonium group, or an organic amine group, A and B independently stand for an alkylene group of 2 to 4 carbon atoms, m stands for 0 or an integer of the value of 1 to 100, and the alkylene oxide group of 2 to 4 carbon atoms in the portion, $(AO)_m$, may be bound in any desired sequence, and (B) 99.9 to 0 mol % of other monomer copolymerizable with the sulfonic acid type monomer, and polymers obtained by neutralizing the aforementioned polymers with an alkaline substance into a cement in the presence of water, wherein an amount of said dispersant is to parts by weight per 100 parts by weight of said cement, and an amount of water is 0 to 100 parts by weight per 100 parts by weight of said cement and said dispersant.

PREFERRED EMBODIMENT OF THE INVENTION

The monomer (A) to be used for the present invention is a sulfonic acid type monomer represented by the formula I.

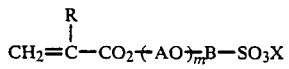
(I)

In the formula, R stands for hydrogen atom or methyl group, X stands for hydrogen atom, a monovalent metallic atom (preferably an alkali metal, especially sodium or potassium,), a divalent metallic atom (preferably an alkaline earth metal, especially calcium or magnesium), ammonium group, or an organic amine group preferably an alkanolamine group, especially a monoethanolamine group or a diethanolamine group or triethanolamine group, A stands for an alkylene group having 2 to 4, more desirably 2 or 3, and most desirably 2, carbon atoms, B stands for an alkylene group having 2 to 4, preferably 2 to 3, carbon atoms, m stands for 0 or an integer of the value of 1 to 100, preferably 0 or an integer of the value of 1 to 50, and the alkylene oxide group of 2 to 4 carbon atoms in the portion, $(AO)_m$, may be bound in any desired sequence.

Examples of the organic amine include alkyl amines such as methylamine, dimethylamine, trimethylamine, ethylamine, diethylamine, triethylamine, isopropylamines, and butylamines; alkanolamines such as monoethanolamine, diethanolamine, triethanolamine, and isopropanolamines; and pyridines.

As typical examples of the sulfonic acid type monomer (A), there can be cited sulfoalkyl (meth)acrylates such as 2-sulfoethyl (meth)acrylate, 2-sulfopropyl (meth)acrylate, 3-sulfopropyl (meth)acrylate, 1-sulfopropan-2-yl (meth)acrylate, 2-sulfobutyl (meth)acrylate, 3-sulfobutyl (meth)acrylate, 4-sulfobutyl (meth)acrylate, 1-sulfobutan-2-yl (meth)acrylate, 1-sulfobutan-3-yl (meth)acrylate, 2-sulfobutan-3-yl (meth)acrylate, 2-methyl-2-sulfopropyl (meth)acrylate, 2-methyl-3sulfopropyl (meth)acrylate, and 1,1-dimethyl-2-sulfoethyl (meth)acrylate, and monovalent metal salts, divalent metal salts, ammonium salts, and organic amine salts of the sulfoalkyl (meth)acrylates; and sulfoalkoxy polyalkylene glycol mono(meth)acrylates such as sulfoethoxy polyethylene glycol mono(meth)acrylate, sulfopropoxy polyethylene glycol mono(meth)acrylate, sulfobutoxy polyethylene glycol mono(meth)acrylate, sulfoethoxy polypropylene glycol mono(meth)acrylate, sulfopropoxy polypropylene glycol mono(meth)acrylate, and sulfobutoxy polypropylene glycol mono(meth)acrylate, monovalent metal salts, divalent metal salts, ammonium salts, and organic amine salts of the sulfoalkoxy polyalkylene glycol mono(meth)acrylates. One member or a mixture of two or more members selected from the group cited above can be used.

The monomer (B) which is used in the present invention is a monomer which is copolymerizable with the sulfonic acid type monomer (A). As examples of the monomer (B), there can be cited unsaturated carboxylic acids such as acrylic acid, methacrylic acid, maleic acid, fumaric acid, and itaconic acid, monovalent metal salts, divalent metal salts, ammonium salts and organic amine salts of the unsaturated carboxylic acids; esters of unsaturated carboxylic acids with aliphatic alcohols of 1 to 20, preferably 1 to 4, carbon atoms or with monoalkoxyalkylene alcohols having an alkylene oxide of 2 to 4, more desirably 2 or 3, and most desirably 2, carbon atoms added in an amount in the range of 1 to 100 mols, preferably 1 to 50 mols, to aliphatic alcohols of 1 to 20, preferably 1 to 4, carbon atoms, preferably acrylic and methacrylic acid esters and alkoxyalkylene glycol (meth)acrylates; (meth)acrylamides; acetic alkenyl esters such as vinyl acetate and propenyl acetate; aromatic vinyls such as styrene, p-methyl styrene, styrene sulfonic acid; and vinyl chloride. One member or a mixture of two or more members selected from the group cited above can be used.

The copolymerizable monomer (B) can be used in an amount such that the polymer or the alkali neutralization product thereof will become soluble in water. There are indications that when an unsaturated carboxylic acid or a salt thereof among other copolymerizable monomers (B) enumerated above is selected to be used in combination with the sulfonic acid type monomer (A), the polymer and/or alkali neutralization product thereof to be consequently obtained manifests a particularly satisfactory cement dispersing ability. In case of the cement dispersant, the copolymerizable monomer (B) is used in an amount in the range of 99 to 1 mol % while the sulfonic acid type monomer (A) is used in an amount in the range of 1 to 99 mol %. Desirably, the copolymerizable monomer (B) is used in an amount in the range of 90 to 10 mol % while the monomer (A) is used in an amount in the range of 10 to 90 mol %. When the water soluble polymers are used for the cement composition or the method for dispersing the cement, the copolymerizable monomer (B) is used in an amount in the range of 99.9 to 0 mol % while the sulfonic acid type monomer (A) is used in an amount in the range of 0.1 to 100 mol %. Desirably, the copolymerizable monomer (B) is used in an amount in the range of 99 to 1 mol % while the monomer (A) is used in an amount in the range of 1 to 99 mol %. More desirably, the copolymerizable monomer (B) is used in an amount in the range of 90 to 10 mol % while the monomer (A) is used in an amount in the range of 10 to 90 mol %.

The polymer contemplated by the present invention can be produced by polymerizing the monomer components by the use of a polymerization initiator. The polymerization can be carried out in a solvent or can be effected in the form of bulk polymerization.

The polymerization in a solvent can be effected either batchwise or continuously. Examples of the solvent effectively usable herein include water; lower alcohols such as methanol, ethanol, isopropanol, and butanols; aromatic and aliphatic hydrocarbons such as benzene, toluene, xylene, cyclohexane, and n-hexane; ethyl acetate; and ketone compounds such as acetone and methyl ethyl ketone.

In view of the solubility of the monomers as the raw materials and the polymer as the product and the ease of the use of the produced polymer, it is desirable to use as the solvent either water or at least one member selected from the group consisting of lower alcohols having 1 to 4 carbon atoms. Among other lower alcohols of 1 to 4 carbon atoms, methanol, ethanol, or isopropanol is used particularly advantageously.

When the polymerization is to be carried out in an aqueous medium, a water-soluble polymerization initiator such as persulfate of ammonium or an alkali metal or hydrogen peroxide is used to initiate the polymerization. In this case, an accelerator such as sodium hydrogen sulfite may be used in combination with the polymerization initiator. When the polymerization is to be carried out by using as a solvent a lower alcohol, an aromatic hydrocarbon, an aliphatic hydrocarbon, ethyl acetate, or a ketone compound, there may be used as a polymerization initiator a peroxide such as benzoyl peroxide or lauroyl peroxide, a hydroperoxide such as cumene hydroperoxide, or an aliphatic azo compound such as azo-bis-isobutyronitrile. The of the polymerization initiator to be used is in the range of 0.01 to 20% by weight, preferably 0.1 to 10% by weight, based on the total amount of the monomers to be used. In this case, such an accelerator as an amine compound may be used in combination with the polymerization initiator. When the polymerization is to be carried out in a mixed solvent containing water and a lower alcohol, a suitable polymerization initiator may be selected from the group of the various polymerization initiators mentioned above or from the group of combination of polymerization initiators and accelerators mentioned above. Though the polymerization temperature is suitably fixed depending on the solvent and the polymerization initiator to be used, it generally falls in the range of 0° to 120° C., preferably 30° to 100° C.

The bulk polymerization requires to use as a polymerization initiator a peroxide such as benzoyl peroxide or lauroyl peroxide, a hydroperoxide such as cumene hydroperoxide, or an aliphatic azo compound such as azo-bis-isobutyronitrile. The amount of the polymerization initiator to be used is in the range of 0.01 to 20% by weight, preferably 0.1 to 10% by weight, based on the total amount of the monomers to be used. The reaction is carried out at a temperature in the range of 50° to 150° C., preferably 50° C. to 120° C.

The polymer to be obtained as described above can be used even in its unmodified form as the principal component for the cement dispersant. The polymer may be neutralized, when necessary, with an alkaline substance and used in the neutralized form as the main component for the cement dispersant. Examples of the alkaline substance advantageously used for this neutralization include hydroxides, oxides, and carbonates of monovalent metals and divalent metals; ammonia, and organic amines.

The average molecular weight of the polymer can fall in a wide range of 1,000 to 100,000, preferably 2,000 to 50,000.

The polymer and/or the neutralization product thereof can be used all by itself or in the form of a mixture with some other substance as the cement dispersant. When the polymer and/or the neutralization product thereof is used as a principal component in combination with a known cement additive. Example of the known cement additive include conventional cement dispersants, air entraining agents, cement wetting and dispersing agents, waterproofing agents, strength enhancing agents, and hardening accelerators.

The cement dispersant of the present invention may be used for such hydraulic cements as portland cement, alumina cement, and various mixed cements and for such hydraulic material as gypsum.

The cement dispersant may be used in an amount of 0.01 to 5 parts by weight, preferably 0.05 to 1 parts by weight per 100 parts by weight of the cement. Further, water may be used in an amount of 10 to 100 parts by weight, preferably 20 to 80 parts by weight per 100 parts by weight of the cement.

The actual use of the cement dispersant of the present invention can be effected by a method which comprises dissolving the cement dispersant in mixing water and subsequently adding the resultant solution as mixing water during the preparation of a cement composition or a method which comprises adding the cement dispersant to a cement composition which has been already mixed thoroughly.

The reason for the outstanding quality manifested by the cement dispersant of the present invention remains yet not to be found. This excellent quality may be logically explained by a supposition that the polymer derived from monomers including a monomer containing a terminal sulfonate group and/or the neutralization product thereof has a structure such that the main chain portions as the sites of adsorption for the surface of cement particles and the terminal sulfonate group portions oriented on the water layer side occur in a form bound through the medium of alkylene groups and polyalkyleneoxide groups and, as the result, when the aforementioned polymer is adsorbed on the surface of the cement particles, the orientation of the terminal sulfonate group on the water layer side is facilitated and the polymer is enabled to manifest an outstanding dispersing ability and a slump loss preventing ability.

There are indications that when a carboxylate group-containing monomer is selected from the various monomers (B) available and this monomer is copolymerized to give rise to a polymer and/or a neutralization product thereof incorporating therein a carboxylate group, the polymer or the neutralization product thereof possesses more desirable cement dispersing ability. An logical explanation of this fact calls for a postulate that the incorporation of the carboxylate group enhances the function of the adsorption sites on the polymer and brings about highly desirable results owing to the ability of dispersion manifested on the cement particles and the ability to curb the slump loss. Generally, oxycarboxylic acids such as gluconic acid and polycarboxylates such as polysodium acrylate are highly liable to retard hardening. It is considered that the polymer which is obtained in this invention by selecting a carboxylate group-containing monomer among other copolymerizable monomers (B) and copolymerizing this selected monomer minimally liable to retard hardening because it possesses a structure combining a sulfonate group and carboxylate group within one molecular unit.

The cement dispersant of the present invention, however, is not limited in any sense by the reason offered above.

The cement dispersant of the present invention enables the cement composition to manifest high flowability without entailing any appreciable retardation of hardening and possesses an outstanding ability to preclude slump loss and, in mortar works and concrete works, brings about a notable improvement in workability. Thus, the cement dispersant of the present invention can be used effectively as a high-performance water-reducing agent for the manufacture of products of concrete or as a super plasticizer of ready-mixed concrete.

Now the cement dispersant of the present invention will be described more specifically below with reference to examples of synthesis and working examples. Of course, the present invention is not limited to these examples. Wherever percents (%) and parts are mentioned in the following examples, they are meant as % by weight and parts by weight unless otherwise specified.

Synthesis 1

In a glass reaction vessel provided with a thermometer, a stirrer, a dropping funnel, a $N_2$ gas inlet tube, and a reflux condenser, 37.2 parts of water was placed and kept stirred and, with the interior of the reaction vessel displaced with nitrogen, heated in an atmosphere of nitrogen up to 95° C.

Then, a monomer mixture solution containing 5 parts of sodium 2-sulfoethyl methacrylate, 15 parts of sodium acrylate, and 30 parts of water and 8.5 parts of an aqueous 5% ammonium persulfate solution were separately added to the reaction vessel over a period of 2 hours. After completion of their addition, 4.3 parts of an aqueous 5% ammonium persulfate solution was added thereto over 1 hour. After completion of this addition, the contents of the reaction vessel were kept at a temperature of 95° C. for 1 hour, allowing the polymerization to complete. Consequently, there was obtained an aqueous 20% solution of a copolymer (1) having an average molecular weight of 5,000. The pH and viscosity of this aqueous 20% solution of the copolymer (1) were as shown in Table 1.

Synthesis 2

In a glass reaction vessel provided with a thermometer, a stirrer, a dropping funnel, a $N_2$ gas inlet tube, and a reflux condenser, 39.3 parts of water was placed and kept stirred and, with the interior of the reaction vessel displaced with nitrogen, heated in an atmosphere of nitrogen up to 95° C.

Then, a monomer mixture solution containing 10 parts of sodium 2-sulfoethyl methacrylate, 10 parts of sodium acrylate, and 30 parts of water and 7.1 parts of an aqueous 5% ammonium persulfate solution were separately added to the reaction vessel over a period of 2 hours. After completion of their addition, 3.6 parts of an aqueous 5% ammonium persulfate solution was added thereto over a period of 1 hour. After this addition, the contents of the reaction vessel were kept at a temperature of 95° C. for 1 hour, allowing the polymerization to complete. Consequently, there was obtained an aqueous 20% solution of a copolymer (2) having an average molecular weight of 4,500. The pH and viscosity of this aqueous 20% solution of the copolymer (2) were as shown in Table 1.

Synthesis 3

In a glass reaction vessel provided with a thermometer, a stirrer, a dropping funnel, a $N_2$ gas inlet tube, and a reflux condenser, 41.4 parts of water was placed and kept stirred and, with the interior of the reaction vessel displaced with nitrogen, heated in an atmosphere of nitrogen up to 95° C.

Then, a monomer mixture solution containing 15 parts of sodium 2-sulfoethyl methacrylate, 5 parts of sodium acrylate, and 30 parts of water and 5.7 parts of an aqueous 5% ammonium persulfate solution were separately added thereto over a period of 2 hours. After completion of their addition, 2.9 parts of an aqueous 5% ammonium persulfate solution was added thereto over a period of 1 hour. After completion of this addition, the contents of the reaction vessel were kept at a temperature of 95° C. for 1 hour, allowing the polymerization to complete. Consequently, there was obtained an aqueous 20% solution of a copolymer (3) having an average molecular weight of 3,500. The pH and viscosity of this aqueous 20% solution of the copolymer (3) were as shown in Table 1.

Synthesis 4

In a glass reaction vessel provided with a thermometer, a stirrer, a dropping funnel, a $N_2$ gas inlet tube, and a reflux condenser, 40.1 parts of water was placed and kept stirred and, with the interior of the reaction vessel displaced with nitrogen, heated in an atmosphere of nitrogen up to 95° C.

Then, a monomer mixture solution containing 9 parts of sodium 2-sulfoethyl acrylate, 9 parts of sodium acrylate, 2 parts of methoxy polyethylene glycol monoacrylate (average addition mol number of ethylene oxide 10), and 30 parts of water and 6.6 parts of an aqueous 5% ammonium persulfate were separately added thereto over a period of 2 hours. After completion of their addition, 3.3 parts of an aqueous 5% ammonium persulfate solution was added thereto over a period of 1 hour. After completion of this addition, the contents of the reaction vessel were kept at a temperature of 95° C. for 1 hour, allowing the polymerization to complete. Consequently, there was obtained an aqueous 20% solution of a copolymer (4) having an average molecular weight of 5,000. The pH and viscosity of this aqueous solution of the copolymer (4) were as shown in Table 1.

Synthesis 5

In a glass reaction vessel provided with a thermometer, a stirrer, a dropping funnel, a $N_2$ gas inlet tube, and a reflux condenser, 42.8 parts of water was placed and kept stirred and, with the interior of the reaction vessel displaced with nitrogen, heated in an atmosphere of nitrogen up to 95° C.

Then, a monomer mixture solution containing 12 parts of sodium 3-sulfopropoxy polyethylene glycol monoacrylate (average addition mol number of ethylene oxide 10), 8 parts of sodium acrylate, and 30 parts of water and 4.8 parts of an aqueous 5% ammonium persulfate solution were separately added thereto over a period of 2 hours. After completion of their addition, 2.4 parts of an aqueous 5% ammonium persulfate solution was added thereto over a period of 1 hour. After completion of this addition, the contents of the reaction vessel were kept at a temperature of 95° C. for 1 hour, allowing the polymerization to complete. Consequently, there was obtained an aqueous 20% solution of a copolymer (5) having an average molecular weight of 6,000. The pH and viscosity of this aqueous solution of the copolymer (5) were as shown in Table 1.

Synthesis 6

In a glass reaction vessel provided with a thermometer, a stirrer, a dropping funnel, a $N_2$ gas inlet tube, and a reflux condenser, 45.6 parts of water was placed and kept stirred and, with the interior of the reaction vessel displaced with nitrogen, heated in an atmosphere of nitrogen up to 95° C.

Then, a monomer mixture solution containing 20 parts of sodium 3-sulfopropoxy polyethylene glycol monomethacrylate (average addtion mol number of ethylene oxide 2) and 30 parts of water and 2.9 parts of an aqueous 5% ammonium persulfate solution were separately added thereto over a period of 2 hours. After completion of their addition, 1.5 parts of an aqueous 5% ammonium persulfate solution was added thereto over a period of 1 hour. After completion of this addition the contents of the reaction vessel were kept at a temperature of 95° C. for 1 hour, allowing the polymerization to complete. Consequently, there was obtained an aqueous 20% solution of a polymer (6) having an average molecular weight of 4,500. The pH and viscosity of this aqueous solution of the polymer (6) were as shown in Table 1.

Synthesis 7

In a glass reaction vessel provided with a thermometer, a stirrer, a dropping funnel a $N_2$ gas inlet tube, and a reflux condenser, 9.2 parts of isopropanol was placed and kept stirred and, with the interior of the reaction vessel displaced with nitrogen, heated in an atmosphere of nitrogen up to the boiling point.

Then, a mixed solution containing 10 parts of 2-sulfoethyl methacrylate, 10 parts of methacrylic acid, 0.4 part of benzoyl peroxide, and 20 parts of isopropanol was added thereto over a period of 2 hours. After completion of this addition, a dispersion having 0.1 part of benzoyl peroxide dispersed in 1 part of isopropanol was added thereto in two split portions, each over a period of 1 hour. After completion of the addition, the contents of the reaction vessel were kept at the boiling point for 3 hours, allowing the polymerization to complete. Subsequently, 170 parts of water and 25.2 parts of triethanol amine were added thereto and the resultant mixture was distilled to expel isopropanol. Consequently, there was obtained an aqueous 20% solution of a copolymer (7) having an average molecular weight of 10,000. The pH and viscosity of this aqueous 20% solution of the copolymer (7) were as shown in Table 1.

In a glass reaction vessel provided with a thermometer, a stirrer, a dropping funnel, a $N_2$ gas inlet tube, and a reflux condenser, 9.2 parts of isopropanol was placed and kept stirred and, with the interior of the reaction vessel displaced with nitrogen, heated in an atmosphere of nitrogen up to the boiling point.

Then, a mixed solution containing 10 parts of 2-sulfoethyl methacrylate, 10 parts of methacrylic acid, 0.4 part of benzoyl peroxide, and 20 parts of isopropanol was added thereto over a period of 2 hours. After completion of this addition, a dispersion having 0.1 part of benzoyl peroxide dispersed in 1 part of isopropanol was added thereto in two split portions, each over a period of 1 hour. After completion of this addition, the contents of the reaction vessel were kept at the boiling point for 3 hours, allowing the polymerization to complete. Subsequently, a dispersion having 6.2 parts of calcium hydroxide dispersed in 110 parts of water was added and the resultant mixture was distilled to expel isopropanol. Consequently, there was obtained an aqueous 20% solution of a copolymer (8) having an average molecular weight of 7,000. The pH and viscosity of this aqueous 20% solution of the copolymer (8) were as shown in Table 1.

Synthesis 9

In a glass reaction vessel provided with a thermometer, a stirrer, a dropping funnel, a $N_2$ gas inlet tube, and a reflux condenser, 42.8 parts of water was placed and kept stirred and, with the interior of the reaction vessel displaced with nitrogen, heated in an atmosphere of nitrogen up to 95° C.

Then, a monomer mixture solution consisting of 18 parts of sodium 3-sulfopropoxy polyethylene glycol monoacrylate (average addition mol number of ethylene oxide 10), 2 parts of hydroxyethyl acrylate, and 30 parts of water and 4.8 parts of an aqueous 5% ammonium persulfate were separately added thereto over a period of 2 hours. After completion of their addition, 2.4 parts of an aqueous 5% ammonium persulfate solution was added thereto over a period of 1 hour. After completion of this addition, the contents of the reaction vessel were kept at a temperature of 95° C. for 1 hour, allowing the polymerization to complete. Consequently, there was obtained an aqueous 20% solution of a copolymer (9) having an average molecular weight of 8,500. The pH and viscosity of this aqueous 20% solution of the copolymer (9) were as shown in Table 1.

Synthesis 10

In a glass reaction vessel provided with a thermometer, a stirrer, a dropping funnel, a $N_2$ gas inlet tube, and a reflux condenser, 47.0 parts of water was placed and kept stirred and, with the interior of the reaction vessel displaced with nitrogen, heated in an atmosphere of nitrogen up to 95° C.

Then, a monomer mixture solution consisting of 20 parts of sodium 3-sulfopropoxy polyethylene glycol monomethacrylate (average addition mol number of ethylene oxide 40) and 30 parts of water and 2.0 parts of an aqueous ammonium persulfate solution were separately added thereto over a period of 2 hours. After completion of their addition, 1.0 part of an aqueous 5% ammonium persulfate solution was added thereto over a period of 1 hour. After completion of this addition, the contents of the reaction vessel were kept at a temperature of 95° C. for 1 hour, allowing the polymerization to complete. Consequently, there was obtained an aqueous 20% solution of a polymer (10) having an average molecular weight of 12,000. The pH and viscosity of this aqueous 20% solution of the polymer (10) were as shown in Table 1.

TABLE 1

| Synthesis | (Co) polymer | Aqueous 20% solution (Note 1) | |
|---|---|---|---|
| | | pH | Viscosity (cps) |
| 1 | Copolymer (1) | 7.3 | 9.9 |
| 2 | Copolymer (2) | 7.2 | 8.8 |
| 3 | Copolymer (3) | 7.1 | 8.1 |
| 4 | Copolymer (4) | 7.5 | 7.2 |
| 5 | Copolymer (5) | 7.2 | 9.0 |
| 6 | Polymer (6) | 7.1 | 8.5 |
| 7 | Copolymer (7) | 6.8 | 11.0 |
| 8 | Copolymer (8) | 7.0 | 10.5 |
| 9 | Copolymer (9) | 7.1 | 9.5 |
| 10 | Polymer (10) | 7.1 | 10.2 |

(Note 1) The pH and viscosity were measured at 25° C. The measurement of the viscosity was made with a viscosimeter, Model B, made by Seiki Kogyo Kenkyusho, at 60 rpm.

EXAMPLE 1

An ordinary portland cement (produced by Sumitomo Cement Co., Ltd.) was used as a cement, a river sand produced in Yodo River (specific gravity 2.51 and fineness modulus 2.78) as a fine aggregate, a crushed stone produced at Takatsuki (specific gravity 2.68 and fineness modulus 6.73) as a coarse aggregate, and the copolymer (1) obtained in Synthesis 1 as a cement dispersant. In a tiltable mixer, these materials weighed out in the fixed proportions of 320 kg of the cement per m$^3$, 170 kg of water per m$^3$, (water/cement ratio 53%), 807 kg of the fine aggregate per m$^3$, 972 Kg of the coarse aggregate per m$^3$, and 0.25% (based on the cement) of the cement dispersant, in such amounts as to give a total of 30 liters of the mixture were kneaded at a rate of 35 rpm for 3 minutes to give rise to a fluid concrete possessing a target slump of 21 cm and a target air content of 4.5% (where the air content failed to reach the target, a minute amount of an air entraining agent made by Yamaso Chemical and marketed under trademark designation of "Vinsol" was used). The fluid concrete immediately after the mixing was sampled and tested for slump and air content.

After completion of the mixing, the contents of the tiltable mixer was continuously mixed at a lowered rate of 3 rpm. The resultant mixture after 60 minutes' standing was sampled and tested for slump and air content, to determine their changes by aging.

The consequently obtained fluid concrete was tested for compressive strength and setting time. The results of these measurement were as shown in Table 2.

The methods for the determination of slump, air content, compressive strength, and setting time and the method for collection of test specimens for the determination of compressive strength were invariably in conformity with the relevant specifications given in Japanese Industrial Standard (JIS A6204).

EXAMPLES 2–10

Fluid concretes were prepared by following the procedure of Example 1, excepting the (co)polymers (2) through (10) obtained in syntheses 2–10 were used in the respective amounts indicated in Table 2. They were tested for slump, air content, compressive strength, and setting time. The results were as shown in Table 2.

Control 1

A fluid concrete for comparison was obtained by following the procedure of Example 1, excepting a commercially available sodium naphthalenesulfonate-formalin condensate was used as a cement dispersant in an amount of 0.4% (based on cement) in the place of the copolymer (1). The fluid concrete was tested for slump, air content, compressive strength, and setting time. The results were as shown in Table 2.

Control 2

A fluid concrete for comparison was obtained by following the procedure of Example 1, excepting a commercially available sodium ligninsulfonate was used as a cement dispersant in an amount of 0.4% (based on cement) in the place of the copolymer (1). The fluid concrete was tested for slump, air content, compressive strength, and setting time. The results were as shown in Table 2.

Control 3

A fluid concrete for comparison was obtained by following the procedure of Example 1, excepting a commercially available polysodium acrylate (average molecular weight 5,000) was used as a cement dispersant in an amount of 0.3% (based on cement) in the place of the copolymer (1). The fluid concrete was tested for slump, air content, compressive strength, and setting time. The results were as shown in Table 2.

TABLE 2

| | Cement dispersant used | | Immediately after mixing | | After 60 minutes' standing | | Residual ratio of slump (%) (Note 1) | Compressive strength at age of 28 days (kg/cm$^2$) | Setting time (hours and minutes) (beginning/ending) |
|---|---|---|---|---|---|---|---|---|---|
| | Kind | Amount added (%) (based on cement) | Slump (cm) | Amount of air (%) | Slump (cm) | Amount of air (%) | | | |
| Example 1 | Copolymer (1) | 0.25 | 21.2 | 4.0 | 16.5 | 4.2 | 78 | 370 | 6:26/8:31 |
| Example 2 | Copolymer (2) | 0.25 | 20.8 | 4.3 | 16.2 | 4.3 | 78 | 379 | 6:03/8:19 |
| Example 3 | Copolymer (3) | 0.30 | 21.0 | 4.0 | 15.9 | 4.3 | 76 | 376 | 5:54/8:05 |
| Example 4 | Copolymer (4) | 0.20 | 21.1 | 4.8 | 17.9 | 4.5 | 85 | 371 | 6:12/8:22 |
| Example 5 | Copolymer (5) | 0.20 | 21.7 | 4.7 | 18.0 | 4.9 | 83 | 369 | 6:19/8:30 |
| Example 6 | Polymer (6) | 0.30 | 21.1 | 4.6 | 16.0 | 4.5 | 76 | 370 | 5:50/8:01 |
| Example 7 | Copolymer (7) | 0.30 | 20.6 | 4.2 | 16.5 | 4.0 | 80 | 372 | 5:45/8:02 |
| Example 8 | Copolymer (8) | 0.25 | 21.1 | 4.0 | 17.3 | 3.9 | 82 | 375 | 5:59/8:15 |
| Example 9 | Copolymer (9) | 0.30 | 20.9 | 4.7 | 16.1 | 4.9 | 77 | 371 | 5:55/8:10 |
| Example 10 | Polymer (10) | 0.30 | 21.2 | 4.9 | 17.0 | 4.3 | 80 | 370 | 6:00/8:15 |
| Control 1 | NSF (Note 2) | 0.40 | 21.1 | 4.1 | 10.5 | 3.7 | 50 | 373 | 5:49/8:03 |
| Control 2 | LS (Note 3) | 0.40 | 21.5 | 6.4 | 12.2 | 5.1 | 57 | 342 | 7:32/9:37 |

TABLE 2-continued

| | Cement dispersant used | | Immediately after mixing | | After 60 minutes' standing | | Residual ratio of slump (%) (Note 1) | Compressive strength at age of 28 days (kg/cm$^2$) | Setting time (hours and minutes) (beginning/ending) |
|---|---|---|---|---|---|---|---|---|---|
| | Kind | Amount added (%) (based on cement) | Slump (cm) | Amount of air (%) | Slump (cm) | Amount of air (%) | | | |
| Control 3 | PSA (Note 4) | 0.30 | 21.6 | 4.0 | 13.0 | 4.1 | 60 | 368 | 6:51/9:02 |

(Note 1) Residual ratio of slump (%) = $\frac{\text{Slump after 60 minutes' standing}}{\text{Slump immediately after mixing}} \times 100$ (Note 2) NSF = Naphthalenesulfonate sodium-formalin condensate
(Note 3) LS = Sodium ligninsulfonate
(Note 4) PSA = Sodium polyacrylate (average molecular weight 5,000)

It is clearly noted from the results of Table 2 that the cement dispersant of the present invention manifests an outstanding ability to curb the slump loss without inducing any noticeable delay in hardening.

What is claimed is:

1. A latex unmodified cement composition comprising a cement and a dispersant having as a main component thereof at least one polymer selected from the group consisting of water soluble polymers obtained from
   (A) 1 to 99 mol % of a sulfonic group containing monomer represented by the formula I:

$$CH_2=C(R)-CO_2B-SO_3X \qquad (I)$$

wherein R stands for hydrogen or methyl, X stands for hydrogen, a monovalent metallic atom, a divalent metallic atom, ammonium, or an organic amine group, B stands for an alkylene group of 2 to 4 carbon atoms, and
   (B) 99 to 1 mol % of at least one monomer selected from the group consisting of acrylic acid, salt of acrylic acid, methacrylic acid, salt of methacrylic acid, and hydroxyalkyl acrylates, and polymers obtained by neutralizing said polymers with an alkaline substance and water,
wherein the amount of said dispersant is 0.01 to 5 parts by weight per 100 parts by weight of said cement and the amount of water is 10 to 100 parts by weight per 100 parts by weight of said cement.

2. A cement composition according to claim 1, wherein B in said formula I stand for an alkylene group of 2 or 3 carbon atoms.

3. A cement composition according to claim 1, wherein X in said formula I stands for hydrogen atom, an alkali metal atom, an alkaline earth metal atom, or an alkanolamine group.

4. A cement composition according to claim 3, wherein said alkaline metal is sodium or potassium.

5. A cement composition according to claim 3, wherein said alkaline earth metal is calcium or magnesium.

6. A cement composition according to claim 3, wherein said alkanolamine group is monoethanolamine group, diethanolamine group, or triethanolamine group.

7. A cement composition according to claim 1, wherein said monomer (B) is at least one member selected from the group consisting of acrylic acid, sodium acrylate, methacrylic acid, and sodium methacrylate.

8. A cement composition according to claim 2, wherein said monomer (B) is used an amount in the range of 90 to 10 mol %.

9. A cement composition according to claim 8, wherein the amount of said dispersant is to parts by weight per 100 parts by weight of said cement, and the amount of water is 20 to 80 parts by weight per 100 parts by weight of said cement.

* * * * *